(12) United States Patent
Koren

(10) Patent No.: US 6,218,872 B1
(45) Date of Patent: Apr. 17, 2001

(54) LINE DRIVER WITH OUTPUT IMPEDANCE SYNTHESIS

(75) Inventor: Victor Koren, Rishon le Zion (IL)

(73) Assignee: Orckit Communications Ltd., Tel-Aviv (IL)

( * ) Notice: Subject to any disclaimer, the term of this patent is extended or adjusted under 35 U.S.C. 154(b) by 0 days.

(21) Appl. No.: 09/470,777

(22) Filed: Dec. 23, 1999

(51) Int. Cl.⁷ ........................................................ H03K 1/00
(52) U.S. Cl. .............................................. 327/108; 327/110
(58) Field of Search .................................... 375/219, 220; 327/108, 109, 110, 304, 560–563, 105

(56) References Cited

U.S. PATENT DOCUMENTS

| | | | |
|---|---|---|---|
| 4,317,205 | * | 2/1982 | Lam .............................................. 375/7 |
| 4,462,105 | * | 7/1984 | Wagner et al. ............................. 375/8 |
| 5,541,990 | * | 7/1996 | Rahamin ................................. 379/402 |
| 5,579,336 | * | 11/1996 | Fitzgerald et al. ..................... 375/219 |
| 5,838,722 | * | 11/1998 | Consi .................................... 375/219 |

OTHER PUBLICATIONS

V. Koren, "Line Driver Economically Synthesizes Impedance," Electronic Design News Jan. 6, 1994, pp. 79.

* cited by examiner

Primary Examiner—Toan Tran (57) ABSTRACT

A line driver for coupling a data transceiver to a line having a load impedance, having a transformer with a primary coil and a secondary coil with a turns ratio of N:1 therebetween. The line driver includes a shunt impedance set to a value equal to a predetermined function of N and of the load impedance, coupled between one end of the primary coil and ground. The line driver also includes a differential amplifier, having a first input coupled to be driven by a transmit circuit of the transceiver, and having an output coupled to drive the line through the secondary of the transformer, and having a second input shunted to ground through the shunt impedance and coupled to receive feedback from the output through the primary coil of the transformer.

11 Claims, 6 Drawing Sheets

LINE DRIVER WITH OUTPUT IMPEDANCE SYNTHESIS

FIELD OF THE INVENTION

The present invention relates generally to transmission line drivers, and specifically to line drivers for data transceivers.

BACKGROUND OF THE INVENTION

Digital Subscriber Line (DSL) systems are commonly used as one of the methods of transmitting data when there is a wired connection, such as a twisted wired pair, between a transmitter and a receiver. Modems which operate in an Asymmetric DSL (ADSL) mode typically use a multitone signaling technique known as discrete multitone (DMT) signaling, and a DMT signal may be considered to be composed of a large number of sinusoidal signals. Each sinusoidal signal has a relatively small varying amplitude and phase, but the DMT signal which is the sum of the sinusoidal signals typically has a large dynamic range. In other words, even though the average signal voltage amplitude is low, the DMT signal contains high and infrequent voltage peaks. To avoid signal distortion, the peaks must be transmitted and received accurately.

Typical ADSL modems utilize a relatively high voltage power supply in order to transmit the DMT signal without distortion. Accordingly, line drivers of typical modems use power inefficiently, since most of the time the signal being sent has a low voltage amplitude. The resultant low efficiency of the line drivers means that the power consumed is large. Thus, when many modems must be deployed in a single location, as is the case, for example, in the central office of a regional telephone company, the heat generated because of the low modem efficiency limits the number of modems that can be installed in a given space.

For efficient operation, all modems need to have good impedance matching at the output of the modem. Typically, a resistor in series with the output of an operational amplifier, which acts as a line driver signal amplifier, is used to define the output impedance, which is set equal to the load impedance to achieve good impedance matching. In this situation the resistor dissipates half the power delivered by the amplifier, and the load only receives half of the amplifier's voltage output.

Methods are known in the art to decrease the power consumption of line drivers for signals with a high dynamic range. In an article entitled "Line Driver Economically Synthesizes Impedance," by Koren, in the Jan. 6, 1994, issue of *Electronic Design News*, which is incorporated herein by reference, there is a description of a method of synthesizing the output impedance so as to reduce the value of the resistor in series with the output of an operational amplifier. The method utilizes two feedback loops, both using resistors. In order for the driver to work correctly, all resistors in the system must have very close tolerances and must be carefully matched.

SUMMARY OF THE INVENTION

It is an object of some aspects of the present invention to provide line driver apparatus having reduced power consumption.

It is a further object of some aspects of the present invention to provide line driver apparatus wherein the output series resistor is eliminated.

It is a further object of some aspects of the present invention to provide a modem using line driver circuitry such that received signals are delivered to receiver circuits with a high amplitude, while transmitted signals are largely prevented from reaching the receiver circuits.

It is a yet further object of some aspects of the present invention to provide line driver apparatus that has a well-defined, predetermined output impedance.

In preferred embodiments of the present invention, a transmit circuit of a modem, preferably an Asymmetric Digital Subscriber Line (ADSL) modem, is coupled by a line driver to a transmission line. The line driver comprises an operational amplifier, a transformer which is most preferably connected as an autotransformer, and a balancing network. An inverting input of the amplifier is shunted by the network, and also receives feedback from the amplifier output via a primary coil of the transformer, so that the feedback is negative. A secondary coil of the transformer is connected in series between the amplifier output and the line being driven. A transmit port is formed between the non-inverting input of the amplifier and a ground, and a receive port, for conveying signals received over the line to a receive circuit of the modem, is formed between the inverting input of the amplifier and the line.

This configuration of the line driver circuit enables the impedance of the balancing network to be synthesized conveniently, as a function of the turns ratio of the transformer, so as to couple the modem to the line with enhanced efficiency, relative to line drivers known in the art. The balancing network impedance is most preferably set to be equal to the turns ratio times an impedance of the transmission line. When this is the case, the negative feedback provided from the transformer to the amplifier input, and the shunting of the input by the balancing network, mean that line drivers constructed as described above have the following properties:

High signal rejection between the transmit and receive ports, i.e., there is high transmit port to receive port isolation.

Zero voltage loss between the output of the operational amplifier and the line driver output.

All of the voltage received from the line is transferred to the receive port.

The output impedance of the line driver is a function of the impedance of the receive port, which can thus be set to give optimal impedance matching to any particular line.

There is therefore provided, in accordance with a preferred embodiment of the present invention, a line driver for coupling a data transceiver to a line having a load impedance, including:

a transformer, including a primary coil and a secondary coil with a turns ratio of N:1 therebetween;

a shunt impedance set to a value equal to a predetermined function of N and of the load impedance, coupled between one end of the primary coil and ground; and a differential amplifier, having a first input coupled to be driven by a transmit circuit of the transceiver, and having an output coupled to drive the line through the secondary of the transformer, and having a second input shunted to ground through the shunt impedance and coupled to receive feedback from the output through the primary coil of the transformer.

Preferably, the second input of the differential amplifier is coupled to a first connection of a receive circuit of the transceiver, and the line is coupled to a second connection of the receive circuit.

Preferably, an output impedance of the line driver is approximately equal to an impedance of the receive circuit divided by N plus one.

Preferably, the value of the shunt impedance is chosen as a function of N, so as to isolate the receive circuit from the transmit circuit.

Further preferably, the value of the shunt impedance is approximately equal to N times the load impedance.

Preferably, the transformer is connected as an autotransformer, having a common node coupled to the output of the amplifier.

Alternatively, the transformer includes a tertiary coil, insulated from the primary coil and the secondary coil and-coupled to a receive circuit of the transceiver.

Alternatively, the shunt impedance includes a voltage-divider having a voltage-tap coupled to the first input of the differential amplifier.

Preferably, the second input of the differential amplifier is an inverting input.

There is further provided, in accordance with a preferred embodiment of the present invention, a method for coupling a data transceiver to a line having a load impedance, using a transformer having primary and secondary coils in a turn ratio of N:1, the method including:

coupling a transmit circuit of the transceiver to a first input of a differential amplifier;

coupling an output of the differential amplifier to drive the line through the secondary coil of the transformer;

coupling the output of the differential amplifier through the primary coil of the transformer to provide feedback to a second input of the differential amplifier; and shunting the second input of the differential amplifier to ground through a shunt impedance set to a value equal to a predetermined function of N and the load impedance.

Preferably, the method includes coupling the second input of the differential amplifier to a first connection of a receive circuit of the transceiver and coupling the line to a second connection of the receive circuit.

The present invention will be more fully understood from the following detailed description of the preferred embodiments thereof, taken together with the drawings, in which:

DETAILED DESCRIPTION OF PREFERRED EMBODIMENTS

Figure 1:
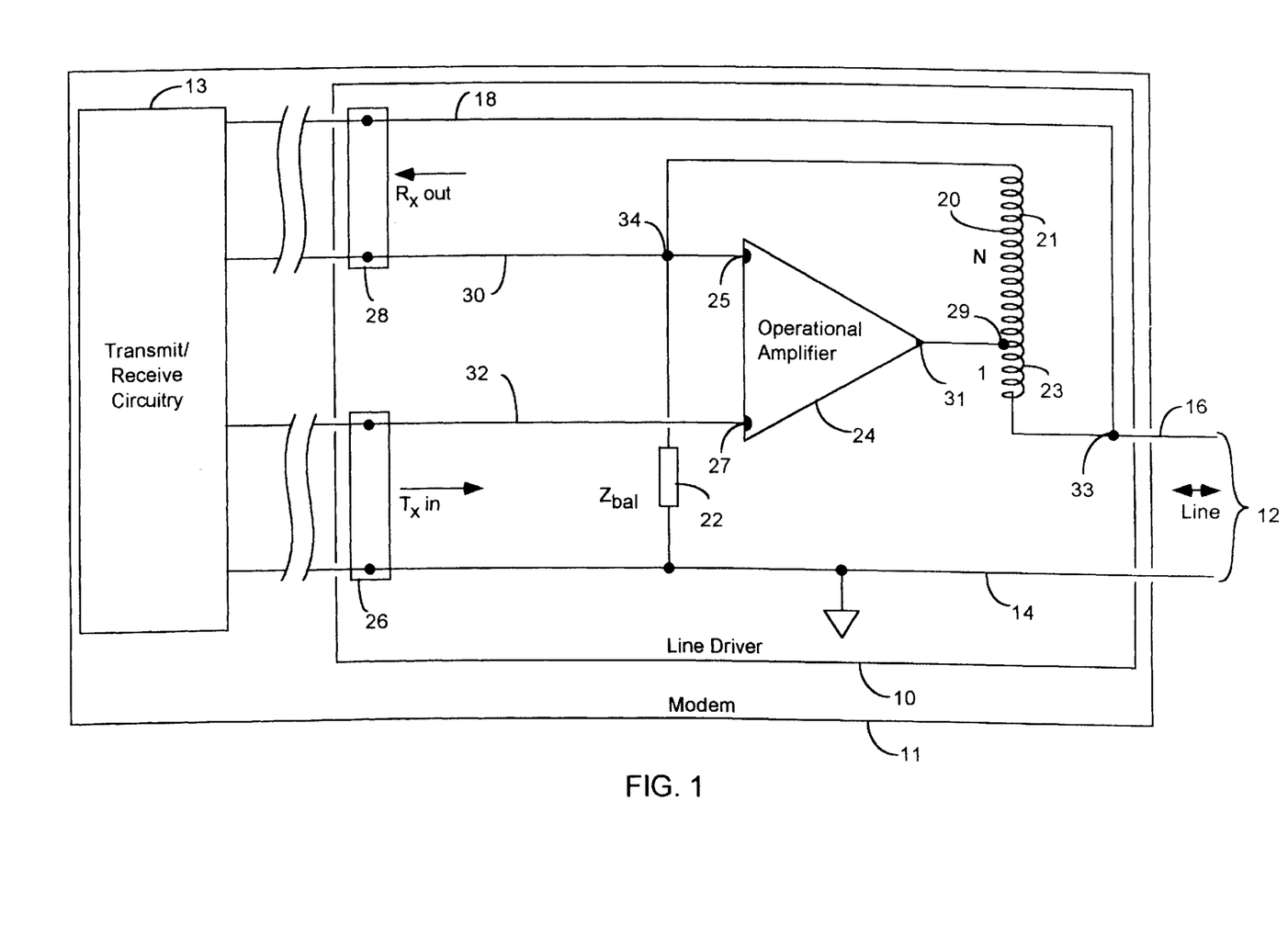
FIG. 1 is a schematic circuit diagram of a line driver, according to a preferred embodiment of the present invention.

Reference is now made to FIG. 1, which is a schematic circuit diagram of a line driver 10, according to a preferred embodiment of the present invention. A modem 11 which acts as a data transceiver comprises transmit/receive circuitry 13 and line driver 10. Circuitry 13 is coupled via line driver 10 to a line 12. Modem 11 is preferably an Asymmetric Digital Subscriber Line (ADSL) modem transmitting digital multitone (DMT) signals. Alternatively, modem 11 is any other industry-standard or custom-built modem. Further alternatively, line driver 10 may be used together with transceivers of other types, not necessarily modems.

Line 12 comprises a ground lead 14 and a signal lead 16, preferably in the form of a twisted pair. Signal lead 16 is directly connected to a lead 18 of a receive output ($R_x$ out) port 28 of driver 10. A lead 30 of port 28 is connected to an inverting first input 25 of an operational amplifier 24, acting as a differential amplifier, and to a first side of an impedance balancing network 22. A second side of network 22 is connected to ground lead 14, so that input 25 is shunted to ground by the network. Network 22 has an impedance represented by $Z_{bal}$. A non-inverting second input 27 of amplifier 24 is connected by a lead 32 to a first side of a transmit input ($T_x$ in) port 26. A second side of port 26 is connected to ground lead 14.

Line driver 10 also comprises a transformer 20, most preferably connected as an autotransformer. A first end of a primary coil 21 of transformer 20 is connected to a first end of a secondary coil 23 of the transformer at a transformer tap 29, which acts as common node. A turns ratio of primary coil 21 to secondary coil 23 is assumed to be N:1. Tap 29 is connected to an output 31 of amplifier 24. A second end of primary coil 29 is connected to inverting input 25 of amplifier 24. Thus, primary coil 21 couples the output of amplifier 24 to the inverting input, so providing negative feedback to the amplifier. A second end of secondary coil 23 is connected to signal lead 16 of line 12. Thus, secondary coil 23 is in series between the output of amplifier 24 and the signal lead of line 12. The components of line driver 10, comprising operational amplifier 24, network 22, transformer 20, and leads therebetween, are most preferably implemented as one or more custom-built devices. Alternatively, the components of line driver 10 are implemented as one or more discrete or semi-custom devices.

Figure 2:
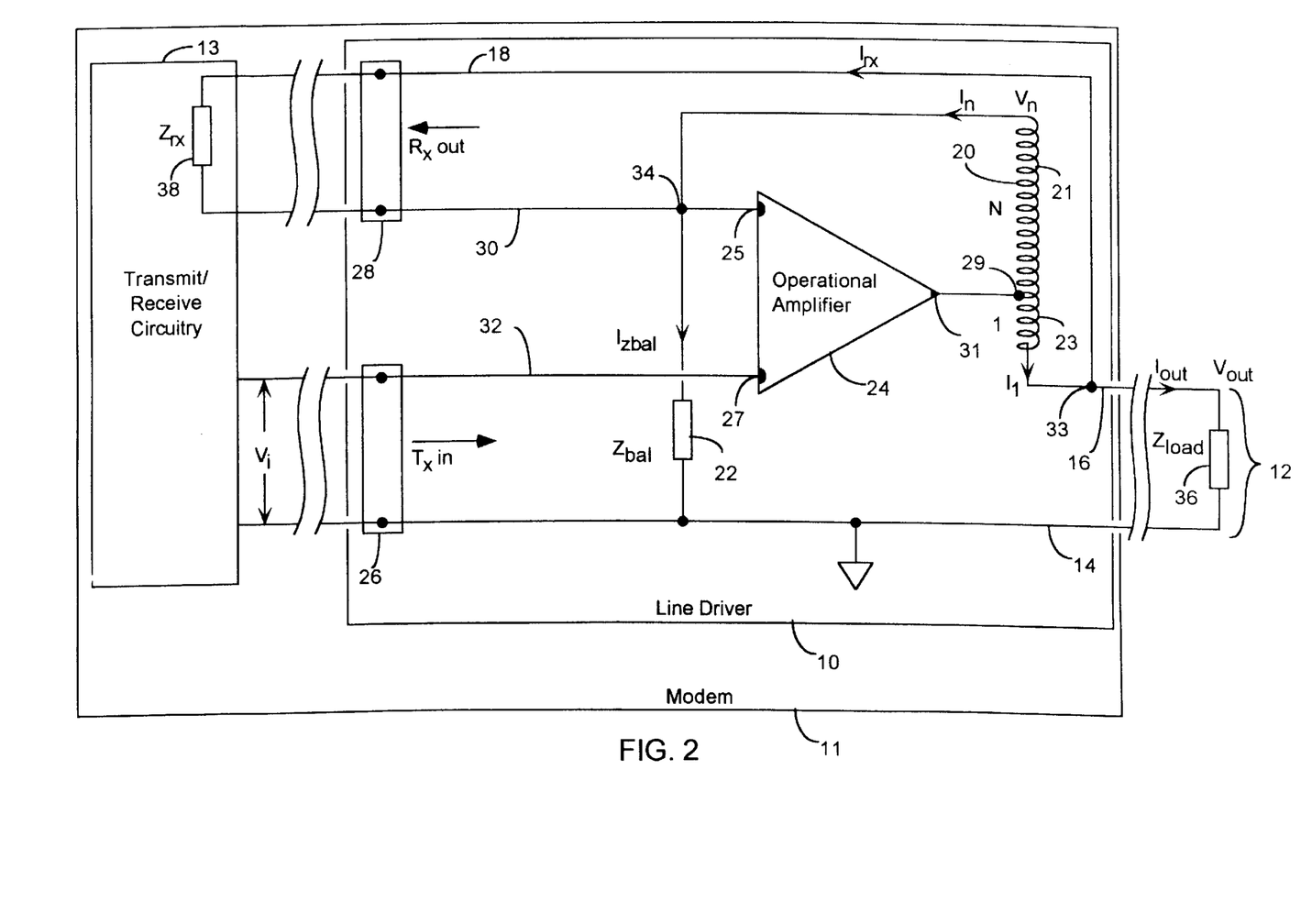
FIG. 2 is a schematic circuit diagram showing circuit parameters used in analyzing aspects of the line driver of FIG. 1, according to a preferred embodiment of the present invention.

FIG. 2 is a schematic circuit diagram showing circuit parameters used in analyzing aspects of line driver 10, according to a preferred embodiment of the present invention. The parameters shown are used hereinbelow to find a condition for isolation between $T_x$ port 26 and $R_x$ port 28, and to find a voltage loss from output 31 of amplifier 24. A voltage $V_i$ is input from $T_x$ port 26 at non-inverting input 27 of amplifier 24. Primary coil 21 generates a current $I_n$ at a voltage $V_n$. Secondary coil 23 generates a current $I_1$. $Z_{load}$ is a load impedance 36 of line 12, which is supplied with a voltage $V_{out}$ at a current $I_{out}$ by line driver 10. $Z_{rx}$ is a receive impedance 38 of circuitry 13, coupled to $R_x$ port 28, which receives a current $I_{rx}$.

For $T_x$ port 26 to be isolated from $R_x$ port 28, the current $I_{rx}=0$ when $V_i$ is input. If $I_{rx}=0$, then a voltage $V_{rx}$ across $Z_{rx}$ ($=I_{rx} \cdot Z_{rx}$)=0. Thus, $V_{out}=V_n$.

The high gain of amplifier 24 and the negative feedback provided by primary coil 21 signifies that the input voltage, between non-inverting input 27 and inverting input 25 of the amplifier, is close to zero, so that $V_n \approx V_i$. Since amplifier 24 is an operational amplifier, its input impedance is extremely high, so that the input currents at both the non-inverting and at the inverting input are effectively zero. Considering the currents through a node 34, $I_n=I_{zbal}$, where $I_{zbal}$ is the current through network impedance 22. By Ohm's law $I_{zbal}=V_n/Z_{bal}$, so that $$I_n=V_n/Z_{bal}=V_i/Z_{bal} \qquad (1)$$

Considering the currents through a node 33, since $I_{rx}=0$, $$I_l=I_{out}=V_{out}/Z_{load} \qquad (2)$$

Since transformer 20 has a turns ratio of N:1, $I_l=I_n\cdot N$, and substituting equations (1) and (2) into this equation gives $V_{out}/Z_{load}=(V_i/Z_{bal})\cdot N$, which rearranges to $$Z_{bal}=N\cdot Z_{load} \qquad (3)$$

Thus, from equation (3), if the impedance $Z_{bal}$ of network 22 is set to be N times the impedance $Z_{load}$ of line 12, there is effectively isolation between $T_x$ port 26 and $R_x$ port 28.

To determine the voltage loss between $T_x$ port 26 and line 12, assume that the impedance $Z_{bal}$ of network 22 is set according to equation (3). As shown above, $V_{out}=V_n$, so that there is substantially no voltage drop across transformer 20. Thus the voltage at tap 29, corresponding to the voltage output from amplifier 24, is $V_{out}$, and so in operating driver 10 there is no voltage loss.

Figure 3:
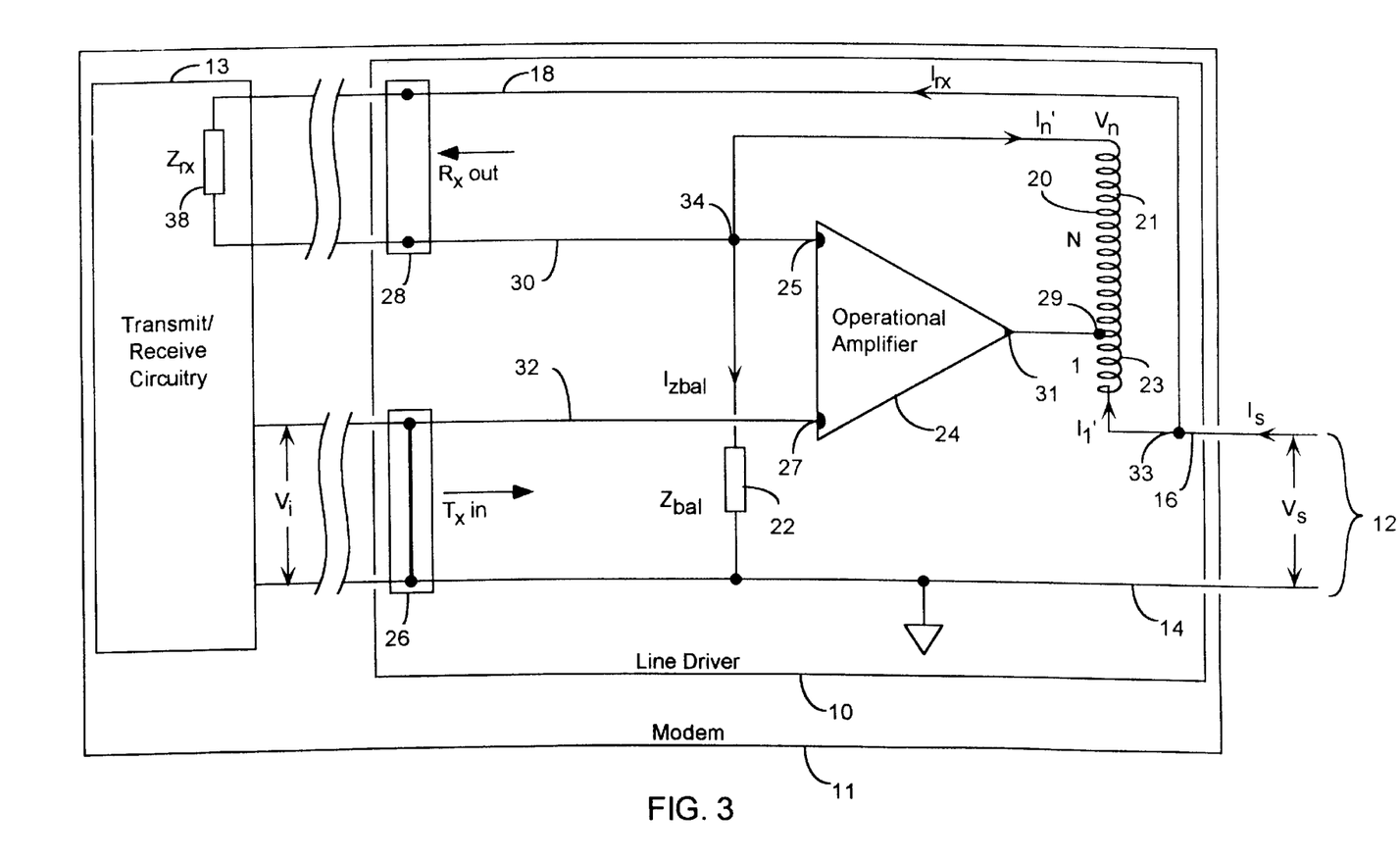
FIG. 3 is a schematic circuit diagram showing circuit parameters used in analyzing further aspects of the line driver of FIG. 1, according to a preferred embodiment of the present invention.

FIG. 3 is a schematic circuit diagram showing circuit parameters used in analyzing further aspects of line driver 10, according to a preferred embodiment of the present invention. The parameters shown are used hereinbelow to find an output impedance $Z_{out}$ of driver 10, and a voltage gain of a signal received from line 12. Line 12 is assumed to supply a current $I_s$ at a potential $V_s$, and non-inverting input 27 is assumed shorted to ground line 14, so that $V_i=0$. Primary coil 21 generates a current $I_n'$ and secondary coil 23 generates a current $I_l'$. As described above with reference to FIG. 2, $V_i \approx V_n=0$. Since $V_n=0$, a current $I_{zbal}$ through network 22 is zero, and the current into inverting input 25 is zero. Considering currents at node 34, $I_n'=I_{rx}$. By Ohm's law, $I_{rx}=V_s/Z_{rx}$, so that $I_n'=V_s/Z_{rx}$. Since transformer 20 has a turns ratio of N:1, $I_n'=I_n'\cdot N$.

At node 33, the currents satisfy the relation: $I_s=I_l'+I_{rx}$. Substituting for $I_l'$ and $I_{rx}$, $$I_s=V_s/Z_{rx}\cdot N+V_s/Z_{rx}=(N+1)\cdot V_s/Z_{rx} \qquad (4)$$

By definition, the output impedance $Z_{out}$ is $V_s/I_s$. Rearranging equation (4) gives $$V_s/I_s=Z_{out}=Z_{rx}/(N+1) \qquad (5)$$

From equation (5) the output impedance is the impedance of the load at $R_x$ port 28, divided by (N+1).

Typically, impedance $Z_{out}$ is set to be equal to the load impedance $Z_{load}$ in order to achieve good matching. In this case, if $Z_{rx}$ is set equal to $Z_{load}\cdot(N+1)$, $Z_{out}=Z_{load}$.

Since $V_n=0$ then the voltage across $Z_{rx}$ is $V_s$. Thus all the voltage $V_s$ received by line 12 is transferred to $R_x$ port 28. Thus the $R_x$ voltage gain is unity.

Figure 4:
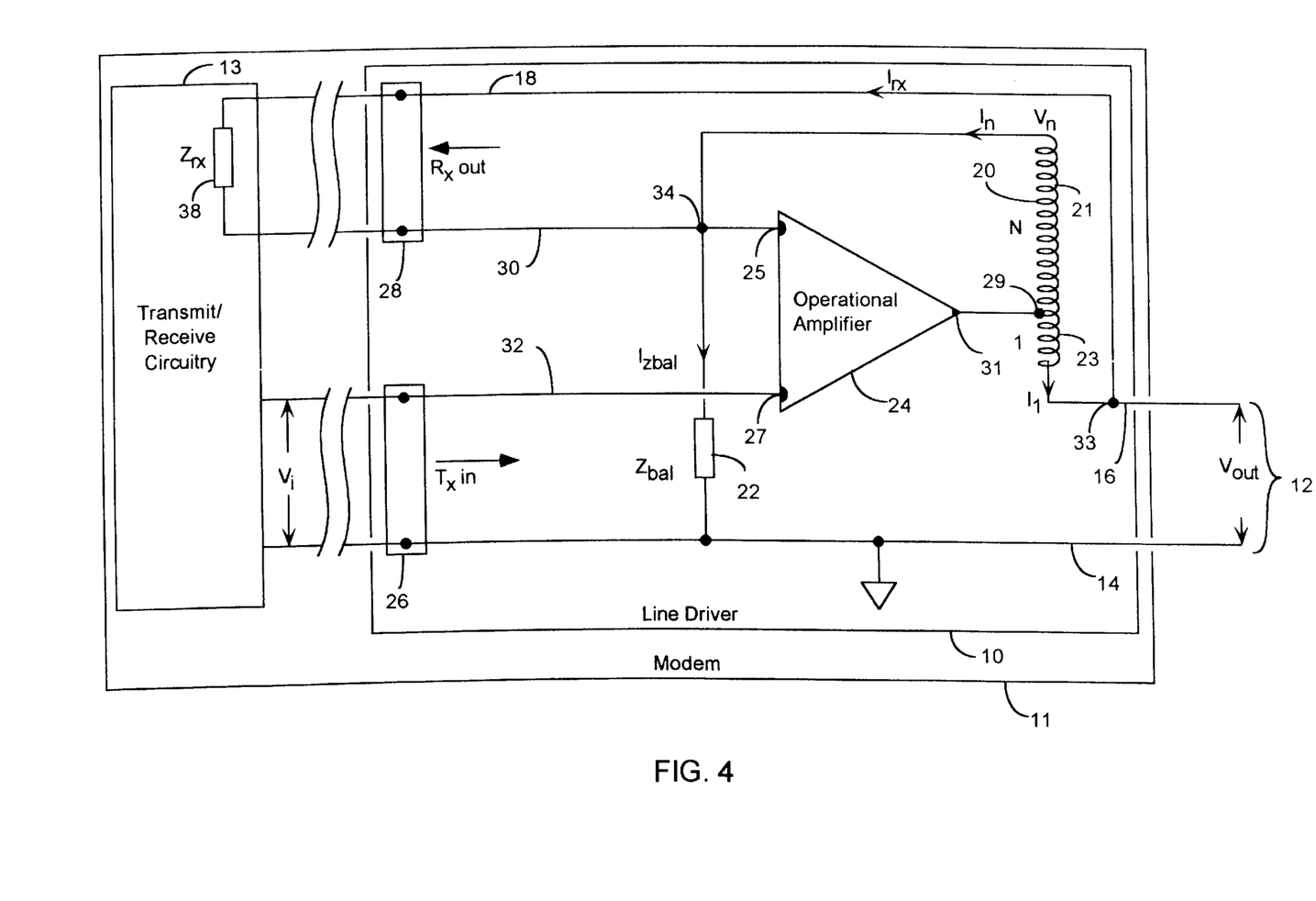
FIG. 4 is a schematic circuit diagram showing circuit parameters used in analyzing still further aspects of the line driver of FIG. 1, according to a preferred embodiment of the present invention.

FIG. 4 is a schematic circuit diagram showing circuit parameters used in analyzing still further aspects of line driver 10, according to a preferred embodiment of the present invention. The parameters shown are used to find a $T_x$ gain of driver 10. The analysis hereinbelow assumes that the line output is open circuit, i.e., that the impedance $Z_{load}$ of the line is infinite, and an open circuit gain $Av_{emf}$ (where emf is electromotive force) of driver 10 is found for a voltage $V_i$ input at non-inverting input 27 of amplifier 24. (An actual voltage gain for a finite external impedance $Z_{load}$ is given by $Av=Av_{emf}Z_{load}/(Z_{out}+Z_{load})$ where $Z_{out}$ is the impedance of driver 10.)

As shown above with reference to FIG. 2 and FIG. 3, $V_n \approx V_i$. Since there is infinite impedance at line 12 output, consideration of currents at node 33 gives $I_{rx}=I_l$. Since the turns ratio of transformer 20 is N:1, $I_n=I_l/N$. Consideration of currents at node 34, and Ohm's law, leads to $V_n/Z_{bal}=I_{rx}+I_n$. Substituting from the above gives $V_i/Z_{bal}=I_l+I_l/N=I_l\cdot(N+1)/N$, so that $$I_l=V_i\cdot N/(Z_{bal}(N+1)) \qquad (6)$$

Since $V_{out}$ is the voltage across $Z_{rx}$ plus $V_n$, $V_{out}=Z_{rx}\cdot I_{rx}+V_n$, which, since $V_n \approx V_i$ and $I_{rx}=I_l$, can be rewritten as $V_{out}=Z_{rx}\cdot I_l+V_i$, or from equation (6)

$$V_{out}=Z_{rx}(V_i\cdot N/(Z_{bal}(N+1)))+V_i \qquad (7)$$

Rearranging equation (7), and utilizing the defining relation for $Av_{emf}$, wherein $Av_{emf}=V_{out}/V_i$, gives $$Av_{emf}=V_{out}/V_i=(Z_{rx}/Z_{bal})\cdot(N/(N+1))+1 \qquad (8)$$

Equation (8) gives the voltage gain $Av_{emf}$ for driver 10 when the load impedance is infinite, and shows that $Av_{emf}$ is a function of $Z_{rx}$, $Z_{bal}$, and transformer turns ratio N. For example, if $Z_{rx}$ is set equal to $Z_{load}\cdot(N+1)$ (so that $Z_{out}=Z_{load}$, as described above as a condition for good matching with reference to FIG. 3), and $Z_{bal}$ is set equal to $Z_{load}\cdot N$ (the condition for good isolation, as described above with reference to FIG. 2) then $Av_{emf}=2$.

Figure 5:
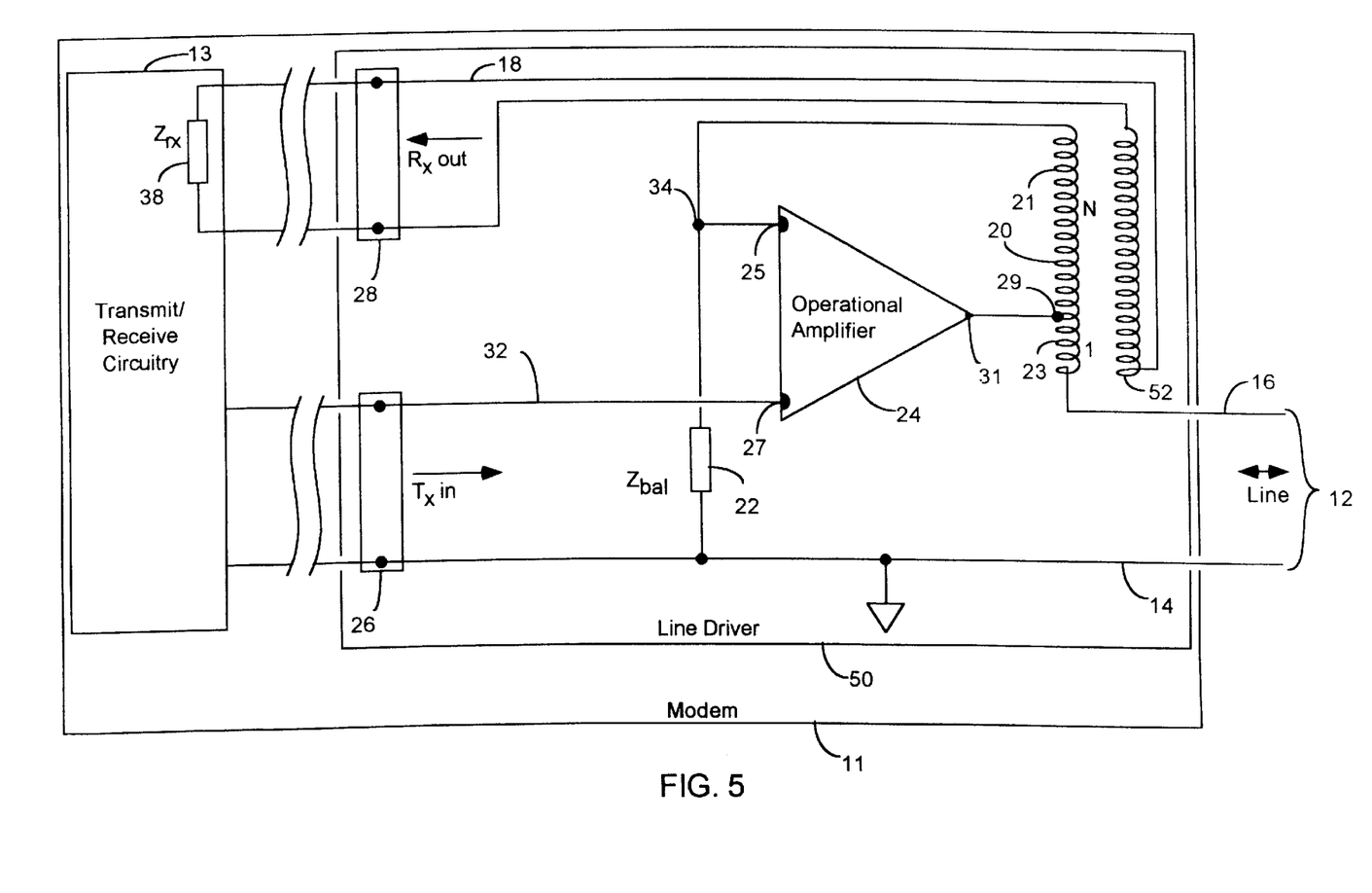
FIG. 5 is a schematic circuit diagram of a line driver, according to an alternative preferred embodiment of the present invention.

FIG. 5 is a schematic circuit diagram of a line driver 50, according to an alternative preferred embodiment of the present invention. Apart from the differences described below, the operation of line driver 50 is generally similar to that of line driver 10 (FIGS. 1, 2, 3, and 4), wherein elements indicated by the same reference numerals in both drivers 50 and 10 are generally identical in construction and in operation. A tertiary coil 52 is added to transformer 20, and is coupled directly to $R_x$ port 28. Coil 52 is isolated from coils 21 and 23, so that Rx port 28 is floating. Thus, $R_x$ port 28 may be connected to substantially any sort of $R_x$ circuit, e.g., the $R_x$ circuit may be balanced or unbalanced. Furthermore, a number of turns of coil 52 may be adjusted to scale $Z_{rx}$ to any required reference impedance. For example, if the number of turns of coil 52 is the same as the total number of turns of coils 21 and 23, $Z_{rx}$ is scaled by a factor of 1; if the number of turns of coil 52 is set at half the total number of turns of coils 21 and 23, $Z_{rx}$ is scaled by a factor of ¼.

Figure 6:
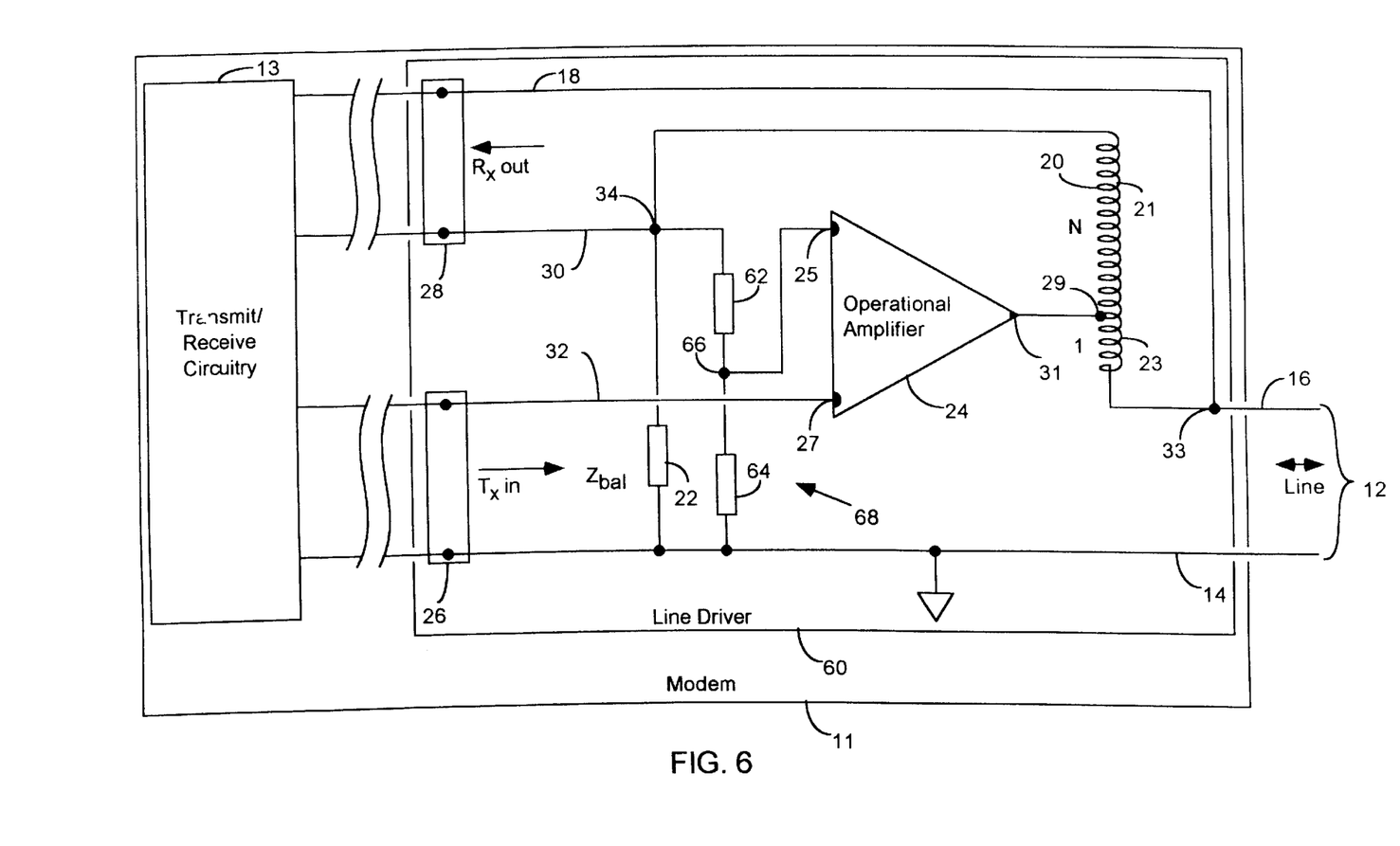
FIG. 6 is a schematic circuit diagram of a line driver, according to a further alternative preferred embodiment of the present invention.

FIG. 6 is a schematic circuit diagram of a line driver 60, according to a further alternative preferred embodiment of the present invention. Apart from the differences described below, the operation of line driver 60 is generally similar to that of line driver 10, whereby elements indicated by the same reference numerals in both drivers 60 and 10 are generally identical in construction and in operation. A resistor voltage divider 68, comprising an upper resistor 62 and a lower resistor 64 connected in series, is connected across $Z_{bal}$ network 22. Resistor 62 and resistor 64 are connected at a junction 66, which acts as a voltage tap, and inverting input 25 of amplifier 24 is connected to junction 66. The open circuit gain $Av_{emf}$ (described above with reference to FIG. 4) of line driver 60 is then a direct function of the ratio of the values chosen for resistor 62 and resistor 64.

For example, if the value of resistor 62 is set to be zero, $Av_{emf}$ is as given by equation (8); if the value of resistor 62 is set equal to the value of resistor 64, $Av_{emf}$ is multiplied by a factor of 2. It will be understood that the values of resistors 62 and 64 should be large compared to the value of $Z_{bal}$ so that the total impedance across network 22 is substantially unchanged. It will be further understood that if network 22 comprises a parallel resistive branch, voltage divider 68 can be incorporated within the branch.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A line driver for coupling a data transceiver to a line having a load impedance, comprising:
    a transformer, comprising a primary coil and a secondary coil with a turns ratio of N:1 therebetween;
    a shunt impedance set to a value equal to a predetermined function of N and of the load impedance, coupled between one end of the primary coil and ground; and
    a differential amplifier, having a first input coupled to be driven by a transmit circuit of the transceiver, and having an output coupled to drive the line through the secondary of the transformer, and having a second input shunted to ground through the shunt impedance and coupled to receive feedback from the output through the primary coil of the transformer.

2. A line driver according to claim 1, wherein the second input of the differential amplifier is coupled to a first connection of a receive circuit of the transceiver, and wherein the line is coupled to a second connection of the receive circuit.

3. A line driver according to claim 2, wherein an output impedance of the line driver is approximately equal to an impedance of the receive circuit divided by N plus one.

4. A line driver according to claim 2, wherein the value of the shunt impedance is chosen as a function of N, so as to isolate the receive circuit from the transmit circuit.

5. A line driver according to claim 1, wherein the value of the shunt impedance is approximately equal to N times the load impedance.

6. A line driver according to claim 1, wherein the transformer is connected as an autotransformer, having a common node coupled to the output of the amplifier.

7. A line driver according to claim 1, wherein the transformer comprises a tertiary coil, insulated from the primary coil and the secondary coil and coupled to a receive circuit of the transceiver.

8. A line driver according to claim 1, wherein the shunt impedance comprises a voltage-divider having a voltage-tap coupled to the first input of the differential amplifier.

9. A line driver according to claim 1, wherein the second input of the differential amplifier is an inverting input.

10. A method for coupling a data transceiver to a line having a load impedance, using a transformer having primary and secondary coils in a turn ratio of N:1, the method comprising:
    coupling a transmit circuit of the transceiver to a first input of a differential amplifier;
    coupling an output of the differential amplifier to drive the line through the secondary coil of the transformer;
    coupling the output of the differential amplifier through the primary coil of the transformer to provide feedback to a second input of the differential amplifier; and
    shunting the second input of the differential amplifier to ground through a shunt impedance set to a value equal to a predetermined function of N and the load impedance.

11. A method according to claim 10, and comprising coupling the second input of the differential amplifier to a first connection of a receive circuit of the transceiver and coupling the line to a second connection of the receive circuit.

\* \* \* \* \*